Patented Oct. 30, 1934

1,978,580

UNITED STATES PATENT OFFICE 1,978,580

SEPARATION OF CARBAZOLE FROM ANTHRACENE

Alphons O. Jaeger, Mount Lebanon, Pa., assignor, by mesne assignments, to American Cyanamid & Chemical Corporation, a corporation of Delaware No Drawing. Application January 30, 1931, Serial No. 512,499

6 Claims. (Cl. 260—46)

This invention relates to the purification of crude anthracene by separating carbazole therefrom.

Crude anthracene, as obtained from the distillation of coal tar, contains considerable proportions of organic impurities, chief among which is carbazole, which may occur in amounts ranging from 15-35% of the product. The separation of carbazole from the anthracene is a practical necessity in many processes in which anthracene is to be used, for example in the production of anthraquinone, but as the two materials are difficultly soluble in most solvents and as they have about the same factor of solubility when dissolved this separation is a difficult matter.

In my prior Patent No. 1,693,713, dated Dec. 4, 1928, reissued Dec. 16, 1930 as Reissue No. 17,902, I have described solvent processes in which crude anthracene is purified by the selective action of furfural and other solvents containing the furane nucleus. This class of solvents is particularly noteworthy by reason of the much greater solvent power it possesses for carbazole than for anthracene, and consequently by its use a very efficient solvent purification process has been developed.

The present invention also deals with the application of heterocyclic compounds for the removal of carbazole, but in a different manner. I have found that in the presence of sodium carbonate and other weak alkalies, carbazole and heterocyclic aldehydes such as furfural and the like, will react chemically to form a condensation product which is soluble in many of the cheaper solvents, such as methyl or ethyl alcohol, acetone and the like. By this reaction carbazole can be removed from anthracene with the use of much smaller amounts of furfural than are necessary in processes depending on its solvent action, and for this reason the present invention is particularly suited for processes involving the purification of relatively smaller amounts of anthracene, as distinguished from the large scale operations for which the furfural solvent process was primarily developed.

The addition products which result from the reaction of carbazole and heterocyclic aldehydes are sufficiently stable to be taken up in suitable solvents and removed by filtration, but are readily broken up by the action of steam or hot water, with or without the addition of small amounts of alkali such as ammonia, and consequently the aldehyde is readily recovered for reuse. The carbazole, being insoluble in water and alcohols, is removed in a pure form by filtration.

The process will be illustrated in greater detail by the following example, which is for illustrative purposes only and to which the invention is not limited.

Example 50 parts of a crude containing about 65% anthracene, 20% carbazole and 15% of other impurities such as phenanthrene, are boiled together with 116 parts by weight of alcohol and 5.8-17.4 parts of furfural with the addition of 3 parts sodium carbonate. The anthracene is filtered off, washed with alcohol and then with water, and after drying is ready for use. The filtrate is cooled for the removal of other hydrocarbons, filtered if necessary, and treated with ammonia for the separation of carbazole, after which the furfural is reused.

As an alternative, the alcohol in the above filtrate may be distilled off and the remaining furfural-carbazole compound treated with dilute ammonia or boiled with water, whereby the insoluble carbazole separates out and the furfural is returned to the process.

From the above crude materials, about 34 parts of anthracene of high purity and 10 parts of carbazole are obtained, and the alcohol recovered can also be reused in the process.

What is claimed as new is:

1. A process of separating carbazole from anthracene which comprises causing the crude mixture of carbazole and anthracene to react with furfural in the presence of a weak alkali which favors the condensation of furfural and carbazole under reaction conditions resulting in the formation of an addition product of furfural and carbazole and dissolving the product so formed in a solvent in which anthracene is relatively insoluble.

2. A process of separating carbazole from anthracene which comprises causing a crude mixture of carbazole and anthracene to react with furfural in the presence of a weak alkali which favors the condensation of furfural and carbazole under reaction conditions resulting in the formation of an addition product of furfural and carbazole and dissolving the said addition product in a monohydric aliphatic alcohol.

3. A process of separating carbazole from anthracene which comprises causing a crude mixture of anthracene and carbazole to react with furfural in the presence of a weak alkali which favors the condensation of furfural and carbazole under reaction conditions which result in the formation of an addition product of carbazole and furfural, dissolving the addition product so formed in a solvent in which anthracene is readily insoluble, filtering the solution from the undissolved anthracene and decomposing the addition product.

4. A process of separating carbazole from anthracene which comprises causing a crude mixture containing anthracene and carbazole to react with furfural in the presence of a weak alkali which favors the condensation of furfural and carbazole under reaction conditions, which results in the formation of an addition product of furfural and carbazole, dissolving the addition product so formed in a monohydric, aliphatic alcohol, filtering the solution from the undissolved anthracene, liberating the carbazole by adding an alkali to the filtrate and separating out the carbazole so liberated.

5. A process according to claim 1 in which the alkaline condensation catalyst is sodium carbonate.

6. A process according to claim 4 in which the alkali is ammonia.

ALPHONS O. JAEGER.